United States Patent
Camp, Jr. et al.

(10) Patent No.: US 7,813,772 B2
(45) Date of Patent: Oct. 12, 2010

(54) METHODS OF OPERATING A MOBILE TERMINAL SUCH THAT A COMMUNICATION OPERATION MODE IS CHANGED BASED ON A CURRENT VOLTAGE OF A BATTERY THAT POWERS THE MOBILE TERMINAL AND RELATED MOBILE TERMINALS AND COMPUTER PROGRAM PRODUCTS

(75) Inventors: William O. Camp, Jr., Chapel Hill, NC (US); Sarandis Kalogeropoulos, Malmö (SE); Mats Wolf, Södra Sandby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 655 days.

(21) Appl. No.: 11/748,785

(22) Filed: May 15, 2007

(65) Prior Publication Data

US 2008/0287080 A1 Nov. 20, 2008

(51) Int. Cl.
*H01Q 11/12* (2006.01)
*H04B 1/04* (2006.01)
*H04B 1/38* (2006.01)
*H04M 1/00* (2006.01)

(52) U.S. Cl. ............... 455/574; 455/127.5; 455/552.1; 455/553.1

(58) Field of Classification Search ........... 455/127.5, 455/436, 437, 552.1, 553.1, 574
See application file for complete search history.

(56) References Cited

U.S. PATENT DOCUMENTS

| 2005/0197122 | A1* | 9/2005 | Sliva ..................... 455/436 |
| 2005/0233749 | A1* | 10/2005 | Karaoguz et al. ........ 455/442 |
| 2005/0239443 | A1* | 10/2005 | Watanabe et al. ....... 455/414.1 |
| 2009/0146791 | A1* | 6/2009 | Jantunen et al. ......... 340/10.2 |
| 2009/0233601 | A1* | 9/2009 | Vikberg et al. .......... 455/436 |

FOREIGN PATENT DOCUMENTS

| EP | 1 675 419 A | 6/2006 |
| EP | 1 708 369 A1 | 10/2006 |

OTHER PUBLICATIONS

International Search Report and Written Opinion for PCT/US2008/000132; date of mailing Sep. 5, 2008.

* cited by examiner

*Primary Examiner*—George Eng
*Assistant Examiner*—Wesley L Kim
(74) *Attorney, Agent, or Firm*—Myers Bigel Sibley & Sajovec, P.A.

(57) ABSTRACT

A mobile terminal having a plurality of communication operation modes is operated by determining a current communication operation mode of the plurality of communication operation modes of the mobile terminal, determining a current voltage of a battery that powers the mobile terminal, comparing the current voltage of the battery with a battery voltage threshold associated with the current communication operation mode, and changing the current communication operation mode to another one of the plurality of communication operation modes based on the comparison of the current voltage of the battery with the battery voltage threshold associated with the current communication operation mode.

22 Claims, 3 Drawing Sheets

METHODS OF OPERATING A MOBILE TERMINAL SUCH THAT A COMMUNICATION OPERATION MODE IS CHANGED BASED ON A CURRENT VOLTAGE OF A BATTERY THAT POWERS THE MOBILE TERMINAL AND RELATED MOBILE TERMINALS AND COMPUTER PROGRAM PRODUCTS

BACKGROUND OF THE INVENTION

The present invention relates to wireless communication technology, and, more particularly, to methods of operating multi-mode mobile terminals and related mobile terminals and computer program products.

Battery technologies are advancing to provide more capacity per unit volume. As a result, the end point voltage is often lower for these newer types of batteries. When used in electronic devices, such as mobile terminals, these batteries may introduce a new design constraint. Many mobile terminals can be made to operate on voltages of 1.8 volts or lower. It is expected that, in the future, most logic may be able to operate on less than one volt. In a mobile terminal, however, the Radio Frequency (RF) power amplifier may be difficult to design for operation at lower voltages. The decreasing efficiency of the matching network as it connects lower impedances to 50 ohms as the operating voltage decreases and operating current increases may limit the acceptable operating voltage to some value related to the maximum output power level. Typical RF power amplifiers deliver full output power at 3.4 volts, which is the minimum operating voltage for many conventional batteries. Many battery technologies may deliver the full battery capacity between about 4.2 volts and 2.4 volts. The discharge curve, however, generally demonstrates more slope from fully charged to fully discharged in contrast with older battery technology that often included a relatively large plateau region in the discharge curve.

SUMMARY OF THE INVENTION

According to some embodiments of the present invention, a mobile terminal having a plurality of communication operation modes is operated by determining a current communication operation mode of the plurality of communication operation modes of the mobile terminal, determining a current voltage of a battery that powers the mobile terminal, comparing the current voltage of the battery with a battery voltage threshold associated with the current communication operation mode, and changing the current communication operation mode to another one of the plurality of communication operation modes based on the comparison of the current voltage of the battery with the battery voltage threshold associated with the current communication operation mode.

In other embodiments, the plurality of communication operation modes comprises a non-call mode and a call mode, the call mode including an associated a communication protocol and/or frequency band.

In still other embodiments, the mobile terminal has a plurality of call modes comprising: a Global System for Mobile Communications (GSM) 850/900 MHz band mode, a GSM 1800/1900 MHz band mode, a Wideband Code Division Multiple Access (WCDMA) mode and/or a Voice over Internet Protocol (VoIP) over WiFi mode.

In still other embodiments, the GSM 850/900 MHz band mode has a battery voltage threshold V1 associated therewith, the GSM 1800/1900 MHz band mode has a battery voltage threshold V2 associated therewith, the WCDMA mode has a battery voltage threshold V3 associated therewith, and the non-call mode has a battery voltage threshold V4 associated therewith.

In still other embodiments, $V1 > V2 > V3 > V4$.

In still other embodiments, V1 is about 2.9 volts, V2 is about 2.7 volts, V3 is about 2.5 volts, and V4 is about 2.4 volts.

In still other embodiments, V1, V2, and V3 are associated with maximum transmit power levels P1, P2, and P3, respectively. The method further comprises comparing a current transmit power level with one of the maximum transmit power levels P1, P2, and P3 associated with the current communication operation mode, and reducing one of the battery voltage thresholds V1, V2, and V3 that is associated with the current communication operation mode if the current transmit power level is less than the one of the maximum transmit power levels P1, P2, and P3 associated with the current communication operation mode.

In still other embodiments, changing the current communication operation mode to another one of the plurality of communication operation modes comprises changing the current communication operation mode to one of the plurality of communication operation modes having a battery voltage threshold associated therewith that is less than or equal to the current voltage of the battery.

In still other embodiments, changing the current communication operation mode to another one of the plurality of communication operation modes comprises operating the mobile terminal in one of the plurality of communication operation modes having a battery voltage threshold associated therewith that is greater than the current voltage of the battery if a handover to a cellular network cell associated with the one of the plurality of communication operation modes having the battery voltage threshold associated therewith that is less than or equal to the current voltage of the battery cannot be executed.

In still other embodiments, changing the current communication operation mode to another one of the plurality of communication operation modes comprises sending a message to a cellular network requesting a handover from a cell associated with the current communication operation mode to a cell associated with the another one of the plurality of communication operation modes.

In still other embodiments, changing the current communication operation mode to another one of the plurality of communication operation modes comprises reporting a Received Signal Strength Indication (RSSI) value to a cellular network that causes the cellular network to initiate a handover from a cell associated with the current communication operation mode to a cell associated with the another one of the plurality of communication operation modes.

In still other embodiments, changing the current communication operation mode to another one of the plurality of communication operation modes comprises sending a list of handover candidates to the cellular network that excludes cells associated with the current communication operation mode so as to cause the cellular network to initiate a handover from a cell associated with the current communication operation mode to a cell associated with the another one of the plurality of communication operation modes.

In still other embodiments, changing the current communication operation mode to another one of the plurality of communication operation modes comprises changing between a cellular communication operation mode and a non-cellular communication operation mode.

In still other embodiments, the method further comprises providing an indication to a user of the mobile terminal that the current communication operation mode is changing to another one of the plurality of communication operation modes.

In further embodiments, a mobile terminal is configured to carry out the following: determining a current communication operation mode of the plurality of communication operation modes of the mobile terminal, determining a current voltage of a battery that powers the mobile terminal, comparing the current voltage of the battery with a battery voltage threshold associated with the current communication operation mode, and changing the current communication operation mode to another one of the plurality of communication operation modes based on the comparison of the current voltage of the battery with the battery voltage threshold associated with the current communication operation mode.

In still further embodiments, a computer program product comprises computer-readable program code embodied on a computer-readable medium. The computer readable program code is configured to carry out the following: determining a current communication operation mode of the plurality of communication operation modes of the mobile terminal, determining a current voltage of a battery that powers the mobile terminal, comparing the current voltage of the battery with a battery voltage threshold associated with the current communication operation mode, and changing the current communication operation mode to another one of the plurality of communication operation modes based on the comparison of the current voltage of the battery with the battery voltage threshold associated with the current communication operation mode.

In further embodiments of the present invention, a handover of a mobile terminal having a plurality of communication operation modes is performed by terminating a communication connection between the mobile terminal and a first base station transceiver associated with a first communication operation mode of the plurality of communication operation modes based on a current voltage of a battery that powers the mobile terminal, and establishing a communication connection between the mobile terminal and a second base station transceiver associated with a second communication operation mode of the plurality of communication operation modes based on the current voltage of the battery that powers the mobile terminal.

In further embodiments, the method further comprises receiving a message at a cellular network associated with the first base station transceiver requesting the handover from a cell associated with the first communication operation mode to a cell associated with the second communication operation mode. Terminating the communication connection and establishing the communication connection are performed responsive to receiving the message.

In still further embodiments, the method further comprises receiving a Received Signal Strength Indication (RSSI) value at a cellular network associated with the first base station transceiver. Terminating the communication connection and establishing the communication connection are performed responsive to receiving the RSSI value.

In still further embodiments, the method further comprises receiving a list of handover candidates at a cellular network associated with the first base station transceiver that excludes cells associated with the first communication operation mode. Terminating the communication connection and establishing the communication connection are performed responsive to receiving the list of handover candidates.

In still further embodiments, the plurality of communication operation modes comprises a non-call mode and a call mode, the call mode comprising a communication protocol and/or frequency band.

In still further embodiments, the mobile terminal has a plurality of call modes comprising: a Global System for Mobile Communications (GSM) 850/900 MHz band mode, a GSM 1800/1900 MHz band mode, and a Wideband Code Division Multiple Access (WCDMA) mode.

In other embodiments, a cellular network is configured to carry out the following: terminating a communication connection between the mobile terminal and a first base station transceiver associated with a first communication operation mode of the plurality of communication operation modes based on a current voltage of a battery that powers the mobile terminal, and establishing a communication connection between the mobile terminal and a second base station transceiver associated with a second communication operation mode of the plurality of communication operation modes based on the current voltage of the battery that powers the mobile terminal.

In still further embodiments, a computer program product comprises computer-readable program code embodied on a computer-readable medium. The computer readable program code is configured to carry out the following: terminating a communication connection between the mobile terminal and a first base station transceiver associated with a first communication operation mode of the plurality of communication operation modes based on a current voltage of a battery that powers the mobile terminal, and establishing a communication connection between the mobile terminal and a second base station transceiver associated with a second communication operation mode of the plurality of communication operation modes based on the current voltage of the battery that powers the mobile terminal.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
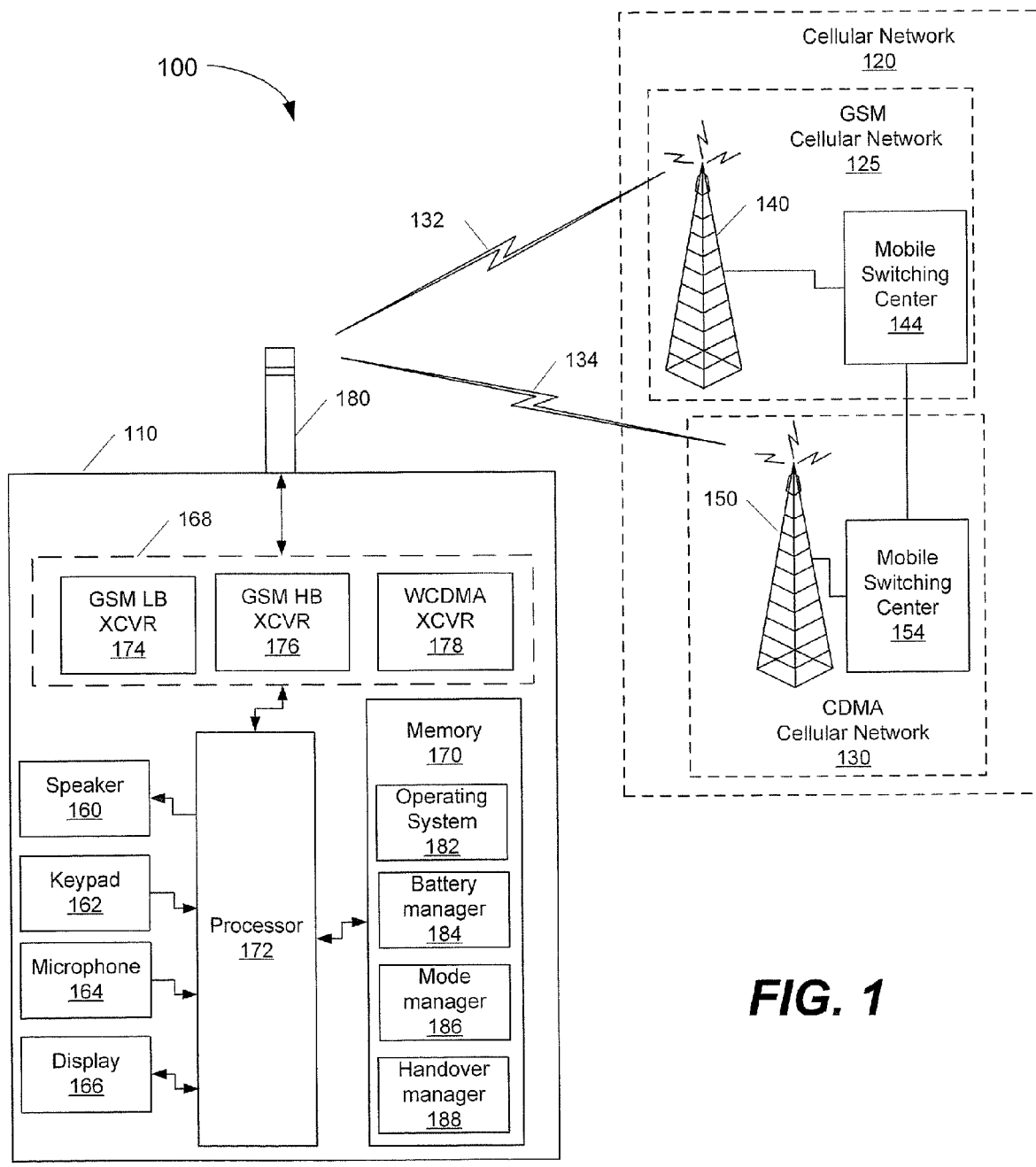
FIG. 1 is a diagram of a wireless network that illustrates changing communication operation modes in a mobile terminal based on a current battery voltage in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, mobile terminals, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: a portable computer diskette, a random access memory (RAM), a read-only memory (ROM), an erasable programmable read-only memory (EPROM or Flash memory), and a compact disc read-only memory (CD-ROM).

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

Mobile terminals may communicate with base station transceivers using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA (WCDMA), CDMA2000, and/or Universal Mobile Telecommunications System (UMTS). Some mobile terminals may be called "multi-mode" mobile terminals because they are capable of communication using more than one cellular communication protocol. Within a single cellular communication protocol, a mobile terminal may be capable of transmitting and receiving over multiple frequency bands. For example, a wireless terminal may be able to operate over the GSM850 band that is used in the United States (also referred to herein as GSM), the EGSM900 band that is used in Europe (also referred to herein as EGSM), the DCS1800 band that is used in Europe (also referred to herein as DCS) and the PCS1900 band that is used in the United States (also referred to herein as PCS). The transmit (TX) and receive (RX) frequencies of these bands are shown in Table 1:

TABLE 1

| Frequency Range | Band |
| --- | --- |
| 824 Mhz-849 Mhz | GSM850 TX Band: US |
| 869 Mhz-894 Mhz | GSM850 RX Band: US |
| 880 Mhz-915 Mhz | EGSM900 TX Band: Europe |
| 925 Mhz-960 Mhz | EGSM900 RX Band: Europe |
| 1710 Mhz-1785 Mhz | DCS1800 TX Band: Europe |
| 1805 Mhz-1880 Mhz | DCS1800 RX Band: Europe |
| 1850 Mhz-1910 Mhz | PCS1900 TX Band: US |
| 1930 Mhz-1990 Mhz | PCS1900 RX Band: US |

Thus, as used herein with respect to a mobile terminal, the phrase "operation mode" refers to the communication protocol used, e.g., GSM, WCDMA, etc., and/or the frequency band used for communication.

For purposes of illustration, various embodiments of the present invention are described herein with respect to a multi-mode mobile terminal that can operate in a GSM 850/900 MHz mode (GSM low band mode), a GSM 1800/1900 MHz band mode (GSM high band mode), and a WCDMA mode. It will be understood that the present invention is not limited to these specific communication protocols and/or operation modes.

Some embodiments of the present invention arise from a realization that the power amplifiers that are used in the transmitter circuitry of a mobile terminal and are associated with different operation modes operate at different power output levels. As a result, these power amplifiers may operate at different voltage levels. Thus, as the battery that powers a mobile terminal discharges over time, it may be desirable to change operation modes based on the current voltage level provided by the battery. This may be especially advantageous with newer batteries that have a generally steeper slope in provided voltage level between fully charged and discharged than older technology batteries.

Referring to FIG. 1, a communication system 100 that illustrates changing operation modes of a mobile terminal based on a current battery voltage, in accordance with some embodiments of the present invention, includes a mobile terminal 110 and a wireless network, such as a cellular network 120. The cellular network 120 may include one or more different types of cellular networks, which may be owned and/or operated by the same or different entities. For purposes of illustration, the cellular network 120 includes a GSM cellular network 125 and a WCDMA cellular network 130. The mobile terminal 110 communicates with the GSM cellular network 125 over a wireless communication link (e.g., channel) 132 using the GSM and/or GSM Evolution (EDGE) communication protocol. The mobile terminal 110 communicates with the WCDMA cellular network 130 over a wireless communication link (e.g., channel) 134 using a protocol that may include, but is not limited to, CDMA (e.g., IS-95), WCDMA, CDMA2000, and Universal Mobile Telecommunications System (UMTS). As used herein, the term "communicate" means transmit, receive, and/or both transmit and receive. Although illustrated as two towers 140 and 150, the GSM cellular network 125 and the CDMA cellular network 130 may share a physical antenna tower.

The GSM cellular network 125 may include a base station transceiver 140 that relays information between the wireless communication link 132 and a mobile switching center 144. The CDMA cellular network 130 may include a base station transceiver 150 that relays information between the wireless communication link 134 and the mobile switching center 154. For purposes of illustration, only one of each the networks 125 and 130 has been illustrated; however it is to be understood that hundreds or thousands of such networks may be used to provide wireless communication services over geographically dispersed regions or cells.

The mobile terminal 110, in accordance with some embodiments of the present invention, includes a speaker 160, a keyboard/keypad 162, a microphone 164, a display 166, a transceiver 168, and a memory 170 that communicate with a processor 172. As the illustrated mobile terminal 110 is a multi-mode mobile terminal, the transceiver 168 comprises multiple transceiver circuits, which are shown as: a GSM low band transceiver 174, a GSM high band transceiver 176, and a WCDMA transceiver 178, which respectively transmit outgoing radio frequency signals to base station transceivers 140 and 150 and receive incoming radio frequency signals from the base station transceivers 140 and 150 via an antenna 180. The radio frequency signals transmitted between the mobile terminal 110 and the base station transceivers 140 and 150 may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. In accordance with various embodiments of the present invention, the mobile terminal 110 may communicate with the base station transceivers 140 and 150 using one or more cellular communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS).

The foregoing components of the mobile terminal 110 may be included in many conventional mobile terminals and their conventional functionality is generally known to those skilled in the art. Accordingly, only operations related to embodiments of the present invention will be described further herein.

The processor 172 communicates with the memory 170 via an address/data bus. The processor 172 may be, for example, a commercially available or custom microprocessor. The memory 170 is representative of the one or more memory devices containing the software and data used to operate the mobile terminal 110. The memory 170 may include, but is not limited to, the following types of devices: cache, ROM, PROM, EPROM, EEPROM, flash, SRAM, and DRAM.

Figure 2:
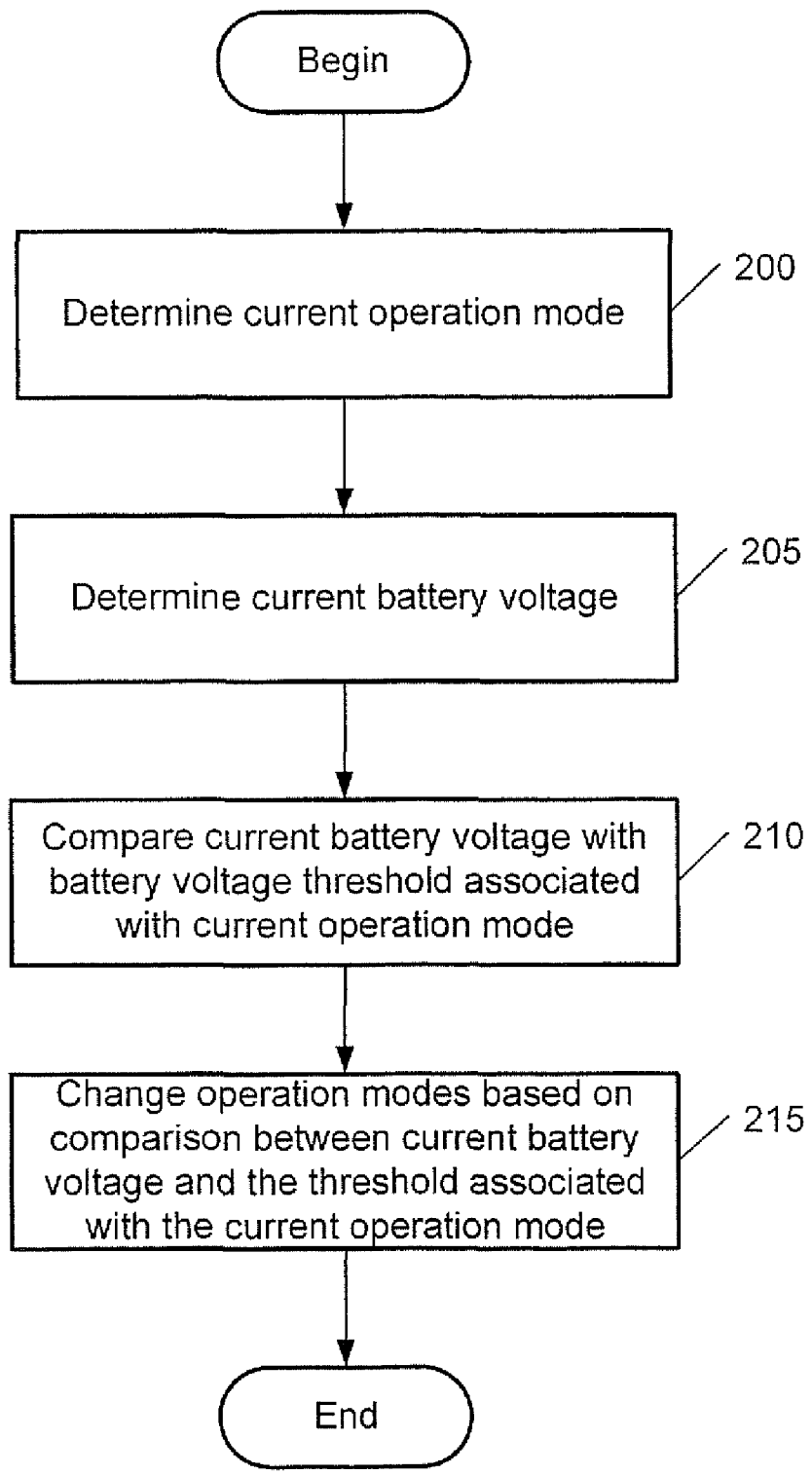
FIGS. 2 and 3 are flowcharts that illustrate operations for changing communication operation modes in a mobile terminal based on a current battery voltage in accordance with some embodiments of the present invention.

As shown in FIG. 2, the memory 170 may contain four or more categories of software and/or data: the operating system 182, a battery manager module 184, an operation mode manager module 186, and a handover manager module 188. The operating system 182 generally controls the operation of the mobile terminal 110. In particular, the operating system 182 may manage the mobile terminal's software and/or hardware resources and may coordinate execution of programs by the processor 172. The battery manager module 184 may be configured to determine the current voltage provided by the battery that powers the mobile terminal 110. As discussed above, batteries used in mobile terminals may, for example, provide a voltage of about 4.2 volts when fully charged and may still provide fully battery capacity down to about 2.4 volts as the battery discharges.

The operation mode manager module 186 may be configured to set the operation mode of the mobile terminal 110 based on the current battery voltage and one or more threshold voltages associated with various operation modes available to the mobile terminal 110. In the exemplary embodiment shown in FIG. 1, the mobile terminal 110 may be configured in a non-call mode or a call mode. Within the call mode, there may be several operation modes available, such as a GSM low band mode, a GSM high band mode, and/or a WCDMA mode. Threshold voltages may be associated with each of the operation modes. In the present example, the non-call mode is associated with a threshold voltage of about 2.4 V, the WCDMA mode is associated with a threshold voltage of about 2.5 V, the GSM high band mode is associated with a threshold voltage of about 2.7 V, and the GSM low band mode is associated with a threshold voltage of about 2.9 V. In general, the mode manager module 186 may attempt to change the operation mode of the mobile terminal 110 to one having a battery threshold voltage associated therewith that is less than a current voltage of the battery. The operation mode manager module 186 may cooperate with the handover manager module 188 to facilitate the change from one operation mode to another.

Although FIG. 1 illustrates an exemplary software and hardware architecture that may be used to change the operation mode of a mobile terminal based on the current battery voltage, it will be understood that the present invention is not limited to such a configuration, but is intended to encompass any configuration capable of carrying out the operations described herein.

Computer program code for carrying out operations of mobile terminals and/or systems discussed above with respect to FIG. 1 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even microcode to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, communication networks, and/or computer program products in accordance with some embodiments of the invention.

These flowchart and/or block diagrams further illustrate exemplary operations of changing the operation mode of a mobile terminal based on the current battery voltage, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Referring to FIG. 2 and with frequent reference to FIG. 1, operations for changing the operation mode of a mobile terminal begin at block 200 where the operation mode manager module 186 determines the current operation mode. The battery manager module 184 determines the current battery voltage at block 205 and the operation mode manager module 186 compares the current battery voltage with the battery voltage threshold associated with the current operation mode at block 210.

In some embodiments of the present invention, the battery voltage thresholds associated with the various operation modes are also associated with maximum transmit power levels. If a transmitter is operating at a lower output power level, then the battery voltage threshold associated with that operation mode may be reduced. This may be illustrated by way of example. If the mobile terminal 110 is operating in the GSM low band mode, which has a maximum transmit power level of +33 dBm, but the GSM low band transmitter is operating at +29 dBm, then the associated battery voltage threshold may be reduced from 2.9 V to 2.75 V.

Returning to FIG. 2, the operation mode manager module, 186 in cooperation with the handover manager 188, may change the operation mode of the mobile terminal 110 based on the comparison of the current battery voltage with the battery threshold voltage associated with the current operation mode. For example, if the mobile terminal 110 is currently in the GSM low band mode and operating at the maximum transmit power level, then the battery voltage threshold is 2.9 V. If the current battery voltage is 2.8 V, then the operation mode manager module 186, in cooperation with the handover manager 188, may change the operation mode of the mobile terminal 110 to the GSM high band mode, which has a battery voltage threshold of 2.7 V.

Figure 3:
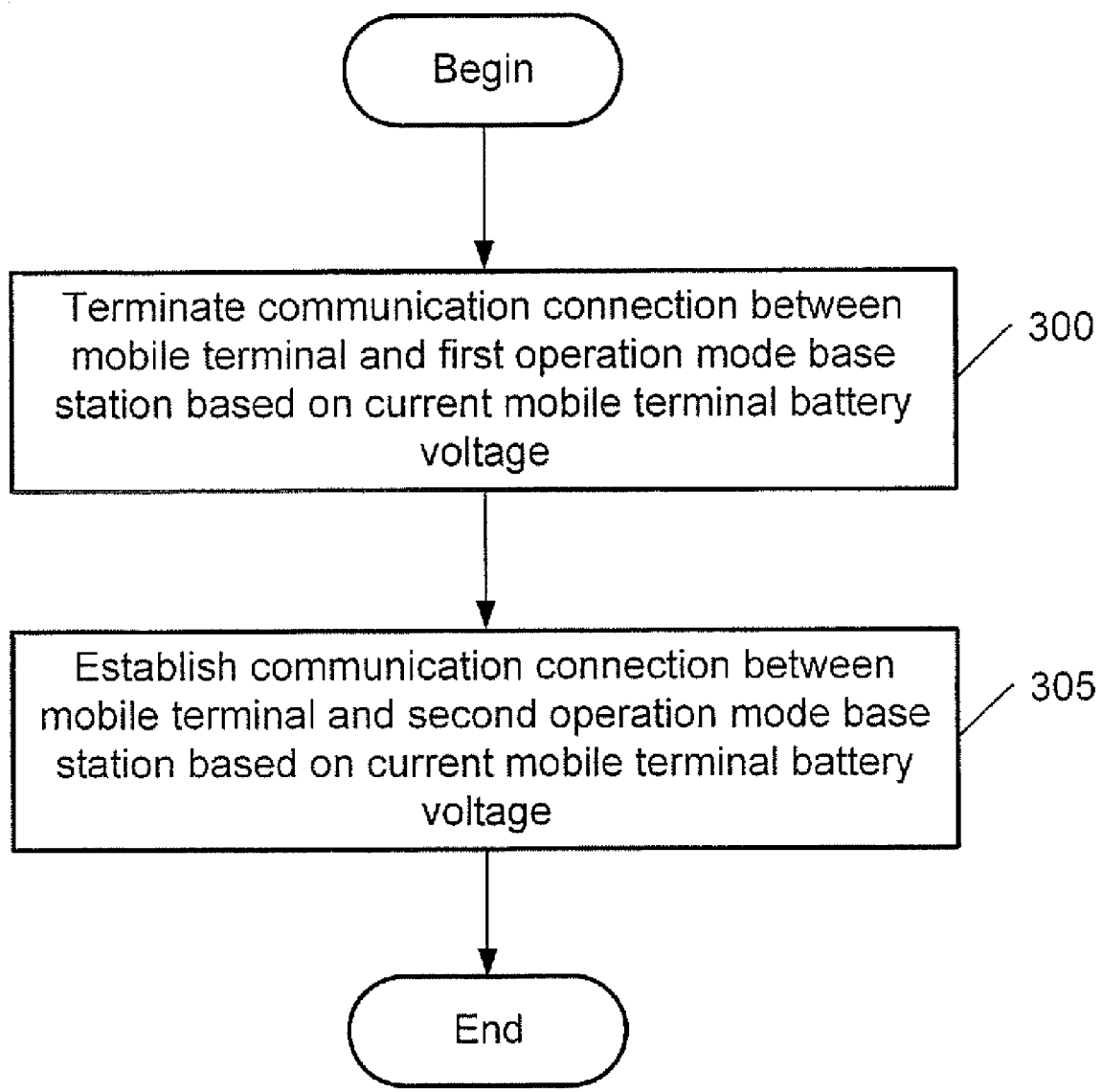

Further exemplary operations for changing the operation mode of a mobile terminal based on the current battery voltage will be described with reference to FIG. 3. The flowchart of FIG. 3 illustrates operations for performing the handover from one operation mode to another. Operations begin at block 300 where the operation mode manager module 186, in cooperation with the handover manager module 188, attempts to change operation modes as discussed above with respect to block 215 of FIG. 2. Specifically, the communication connection between the mobile terminal 110 and a first operation mode base station is terminated based on the current mobile terminal 110 battery voltage. The operation mode change can be initiated in different ways in accordance with various embodiments of the present invention. In some embodiments, the handover manager module 188 may send a message to the cellular network requesting a handover from a cell associated with the current operation mode to a cell associated with another operation mode. As some cellular networks may not support this functionality, in other embodiments, the handover manager module 188 may report a Received Signal Strength Indication (RSSI) value to the cellular network much lower than it actually is to trigger the cellular network to initiate a handover from a cell associated with the current operation mode to a cell associated with another operation mode. In still other embodiments, the handover manager module 188 may exclude from the list of handover candidates that the mobile terminal 110 sends to the cellular network those cells that are associated with the current operation mode. This may cause the cellular network to perform a handover to a cell associated with a different operation mode.

Returning to FIG. 3, at block 305, a communication connection is established between the mobile terminal 110 and a base station associated with a second operation mode that is different from the first operation mode.

Various embodiments of the present invention have been discussed above with respect to a mobile terminal changing operation from one cellular protocol and/or frequency band to another based on a current battery voltage. It will be understood, however, that in other embodiments of the present invention, a mobile terminal may, in general, change from one communication protocol and/or frequency band, including non-cellular communication protocols and/or frequency bands, to another based on a current battery voltage. For example, a mobile terminal may operate using a cellular protocol until the battery voltage drops below a battery voltage threshold V. At that time, the mobile terminal may change operation modes by switching to a non-cellular communication protocol, such as Voice over Internet Protocol (VoIP) over a WiFi network, as discussed above. In particular embodiments, the mobile terminal may change operations modes to VoIP over a WiFi network only if another cellular communication protocol and/or frequency band is unavailable.

In some embodiments, the user of the mobile terminal 110 may be notified in some manner that the phone is switching operation modes based on the current battery voltage so that the user can anticipate degradation or changes in coverage, data rate, etc. Moreover, in some embodiments, the operation mode manager module 186 may be configured to continue to operate the phone in an operation mode having a battery voltage threshold associated therewith that is greater than a current battery voltage if the handover manager module 188 is unable to execute a handover because, for example, no viable handover candidates exist. This could be a user selectable option for use in emergency situations, for example.

Many variations and modifications can be made to the illustrated embodiments without substantially departing from the principles of the present invention. All such variations and modifications are intended to be included herein within the scope of the present invention, as set forth in the following claims.

That which is claimed:

1. A method of operating a mobile terminal having a plurality of communication operation modes, comprising:
   determining a current communication operation mode of the plurality of communication operation modes comprising a non-call and a call mode;
   determining a current voltage of a battery that powers the mobile terminal;

comparing the current voltage of the battery with a battery voltage threshold associated with the current communication operation mode; and changing the current communication operation mode to another one of the plurality of communication operation modes based on the comparison of the current voltage of the battery with the battery voltage threshold associated with the current communication operation mode;

wherein the mobile terminal has a plurality of call modes comprising: a Global System for Mobile Communications (GSM) 850/900 MHz band mode, a GSM 1800/1900 MHz band mode, a Wideband Code Division Multiple Access (WCDMA) mode, and/or a Voice over Internet Protocol (VoIP) over WiFi mode;

wherein the GSM 850/900 MHz band mode has a battery voltage threshold V1 associated therewith, the GSM 1800/1900 MHz band mode has a battery,/voltage threshold V2 associated therewith, the WCDMA mode has a battery voltage threshold V3 associated therewith, and the non-call mode has a battery voltage threshold V4 associated therewith; and wherein V1>V2>V3>V4.

2. The method of claim 1, wherein the plurality of communication operation modes comprise a non-call mode and a call mode, the call mode including an associated communication protocol and/or frequency band.

3. The method of claim 1, wherein V1 is about 2.9 volts, V2 is about 2.7 volts, V3 is about 2.5 volts, and V4 is about 2.4 volts.

4. The method of claim 1, wherein V1, V2, and V3 are associated with maximum transmit power levels P1, P2, and P3, respectively, the method further comprising:

comparing a current transmit power level with one of the maximum transmit power levels P1, P2, and P3 associated with the current communication operation mode; and reducing one of the battery voltage thresholds V1, V2, and V3 that is associated with the current communication operation mode if the current transmit power level is less than the one of the maximum transmit power levels P1, P2, and P3 associated with the current communication operation mode.

5. The method of claim 1, wherein changing the current communication operation mode to another one of the plurality of communication operation modes comprises:

changing the current communication operation mode to one of the plurality of communication operation modes having a battery voltage threshold associated therewith that is less than or equal to the current voltage of the battery.

6. The method of claim 5, wherein changing the current communication operation mode to another one of the plurality of communication operation modes comprises:

operating the mobile terminal in one of the plurality of communication operation modes having a battery voltage threshold associated therewith that is greater than the current voltage of the battery responsive to determining that a handover to a cellular network cell associated with the one of the plurality of communication operation modes having the battery voltage threshold associated therewith that is less than or equal to the current voltage of the battery cannot be executed.

7. The method of claim 1, wherein changing the current communication operation mode to another one of the plurality of communication operation modes comprises:

sending a message to a cellular network requesting a handover from a cell associated with the current communication operation mode to a cell associated with the another one of the plurality of communication operation modes.

8. The method of claim 1, wherein changing the current communication operation mode to another one of the plurality of communication operation modes comprises:

reporting a Received Signal Strength Indication (RSSI) value to a cellular network that causes the cellular network to initiate a handover from a cell associated with the current communication operation mode to a cell associated with the another one of the plurality of communication operation modes.

9. The method of claim 1, wherein changing the current communication operation mode to another one of the plurality of communication operation modes comprises:

sending a list of handover candidates to the cellular network that excludes cells associated with the current communication operation mode so as to cause the cellular network to initiate a handover from a cell associated with the current communication operation mode to a cell associated with the another one of the plurality of communication operation modes.

10. The method of claim 1, wherein changing the current communication operation mode to another one of the plurality of communication operation modes comprises:

changing between a cellular communication operation mode and a non-cellular communication operation mode.

11. The method of claim 1, further comprising:

providing an indication to a user of the mobile terminal that the current communication operation mode is changing to another one of the plurality of communication operation modes.

12. A mobile terminal configured to carry out the method of claim 1.

13. A computer program product comprising computer-readable program code embodied on a non-transitory computer-readable medium, the computer readable program code being configured to carry out the method of claim 1.

14. A method of performing a handover of a mobile terminal having a plurality of communication operation modes, comprising:

terminating a communication connection between the mobile terminal and a first base station transceiver associated with a first communication operation mode of the plurality of communication operation modes comprising a non-call and a call mode based on a comparison of a current voltage of a battery that powers the mobile terminal with a battery voltage threshold associated with the current communication operation mode; and establishing a communication connection between the mobile terminal and a second base station transceiver associated with a second communication operation mode of the plurality of communication operation modes based on the current voltage of the battery that powers the mobile terminal modes based on comparison of the current voltage of the battery that powers the mobile terminal with the battery voltage threshold associated with the current communication operation mode;

wherein the mobile terminal has a plurality of call modes comprising: a Global System for Mobile Communications (GSM) 850/900 MHz band mode, a GSM 1800/1900 MHz band mode, a Wideband Code Division Multiple Access (WCDMA) mode, and/or a Voice over Internet Protocol (VoIP) over WiFi mode;

wherein the GSM 850/900 MHz band mode has a battery voltage threshold V1 associated therewith, the GSM 1800/1900 MHz band mode has a battery voltage threshold V2 associated therewith, the WCDMA mode has a battery voltage threshold V3 associated therewith, and the non-call mode has a battery voltage threshold V4 associated therewith; and wherein V1>V2>V3>V4.

15. The method of claim 14, further comprising:
receiving a message at a cellular network associated with the first base station transceiver requesting the handover from a cell associated with the first communication operation mode to a cell associated with the second communication operation mode, terminating the communication connection and establishing the communication connection being carried out responsive to receiving the message.

16. The method of claim 14, further comprising:
receiving a Received Signal Strength Indication (RSSI) value at a cellular network associated with the first base station transceiver;
wherein terminating the communication connection and establishing the communication connection are performed responsive to receiving the RSSI value.

17. The method of claim 14, further comprising:
receiving a list of handover candidates at a cellular network associated with the first base station transceiver that excludes cells associated with the first communication operation mode;
wherein terminating the communication connection and establishing the communication connection are performed responsive to receiving the list of handover candidates.

18. The method of claim 14, wherein the plurality of communication operation modes comprise a non-call mode and a call mode, the call mode including an associated communication protocol and/or frequency band.

19. A cellular network configured to carry out the method of claim 14.

20. A computer program product comprising computer-readable program code embodied on non-transitory a computer-readable medium, the computer readable program code being configured to carry out the method of claim 14.

21. A method of operating a mobile terminal having a plurality of communication operation modes, comprising:
determining a current communication operation mode of the plurality of communication operation modes comprising a non-call and a call mode;
determining a current voltage of a battery that powers the mobile terminal;
comparing the current voltage of the battery with a battery voltage threshold associated with the current communication operation mode; and
changing the current communication operation mode to another one of the plurality of communication operation modes based on the comparison of the current voltage of the battery with the battery voltage threshold associated with the current communication operation mode
wherein the mobile terminal has a plurality of call modes comprising: a Global System for Mobile Communications (GSM) 850/900 MHz band mode, a GSM 1800/1900 MHz band mode, a Wideband Code Division Multiple Access (WCDMA) mode, and/or a Voice over Internet Protocol (VoIP) over WiFi mode;
wherein the GSM 850/900 MHz band mode has a battery voltage threshold V1 associated therewith, the GSM 1800/1900 MHz band mode has a battery voltage threshold V2 associated therewith, the WCDMA mode has a battery voltage threshold V3 associated therewith, and the non-call mode has a battery voltage threshold V4 associated therewith; and
wherein V1, V2, and V3 are associated with maximum transmit power levels P1, P2, and P3, respectively, the method further comprising:
comparing a current transmit power level with one of the maximum transmit power levels P1, P2, and P3 associated with the current communication operation mode; and
reducing one of the battery voltage thresholds V1, V2, and V3 that is associated with the current communication operation mode if the current transmit power level is less than the one of the maximum transmit power levels P1, P2, and P3 associated with the current communication operation mode.

22. A method of performing a handover of a mobile terminal having a plurality of communication operation modes, comprising:
terminating a communication connection between the mobile terminal and a first base station transceiver associated with a first communication operation mode of the plurality of communication operation modes comprising a non-call and a call mode based on a comparison of a current voltage of a battery that powers the mobile terminal with a battery voltage threshold associated with the current communication operation mode; and
establishing a communication connection between the mobile terminal and a second base station transceiver associated with a second communication operation mode of the plurality of communication operation modes based on comparison of the current voltage of the battery that powers the mobile terminal with the battery voltage threshold associated with the current communication operation mode;
wherein the mobile terminal has a plurality of call modes comprising: a Global System for Mobile Communications (GSM) 850/900 MHz band mode, a GSM 1800/1900 MHz band mode, a Wideband Code Division Multiple Access (WCDMA) mode, and/or a Voice over Internet Protocol (VoIP) over WiFi mode;
wherein the GSM 850/900 MHz band mode has a battery voltage threshold V1 associated therewith, the GSM 1800/1900 MHz band mode has a battery voltage threshold V2 associated therewith, the WCDMA mode has a battery voltage threshold V3 associated therewith, and the non-call mode has a battery voltage threshold V4 associated therewith; and
wherein V1, V2, and V3 are associated with maximum transmit power levels P1, P2, and P3, respectively, the method further comprising:
comparing a current transmit power level with one of the maximum transmit power levels P1, P2, and P3 associated with the current communication operation mode; and
reducing one of the battery voltage thresholds V1, V2, and V3 that is associated with the current communication operation mode if the current transmit power level is less than the one of the maximum transmit power levels P1, P2, and P3 associated with the current communication operation mode.

* * * * *